United States Patent Office 3,520,376
Patented July 14, 1970

3,520,376
TRANSMISSION FOR TRACK-LAYING VEHICLES
Helmut Müller, Heidenheim (Brenz), Germany, assignor to Voith Getriebe KG, Heidenheim (Brenz), Germany
Filed Sept. 30, 1968, Ser. No. 763,581
Claims priority, application Germany, Oct. 14, 1967, 1,655,637
Int. Cl. F16h *37/08;* B62d *11/10*
U.S. Cl. 180—6.7                                    6 Claims

ABSTRACT OF THE DISCLOSURE

A transmission control system for caterpillar vehicles having track drive wheels provided with motive power transfer regulated for speed and torque variation during steering and braking in straight and curved travel movements. The system includes a pair of hydrodynamic fluid control units each having rotors journalled on an intermediate supporting shaft connected to differential transmissions for respective drive wheels; both speed and torque governor means coupled to direction control lever means and brake actuator means respectively regulate fluid supply to the hydrodynamic fluid control means each also having ventilator valve means used for superimposed control over motive power transfer to the drive wheels, both of the hydrodynamic fluid control means upon braking during straight travel of the vehicle and only differentially one of the hydrodynamic control means upon braking during curve travel of the vehicle being fluid filled and regulated proportionately to braking torque parameter due to brake actuator means position independently of vehicle travel speed.

---

Figure 1:
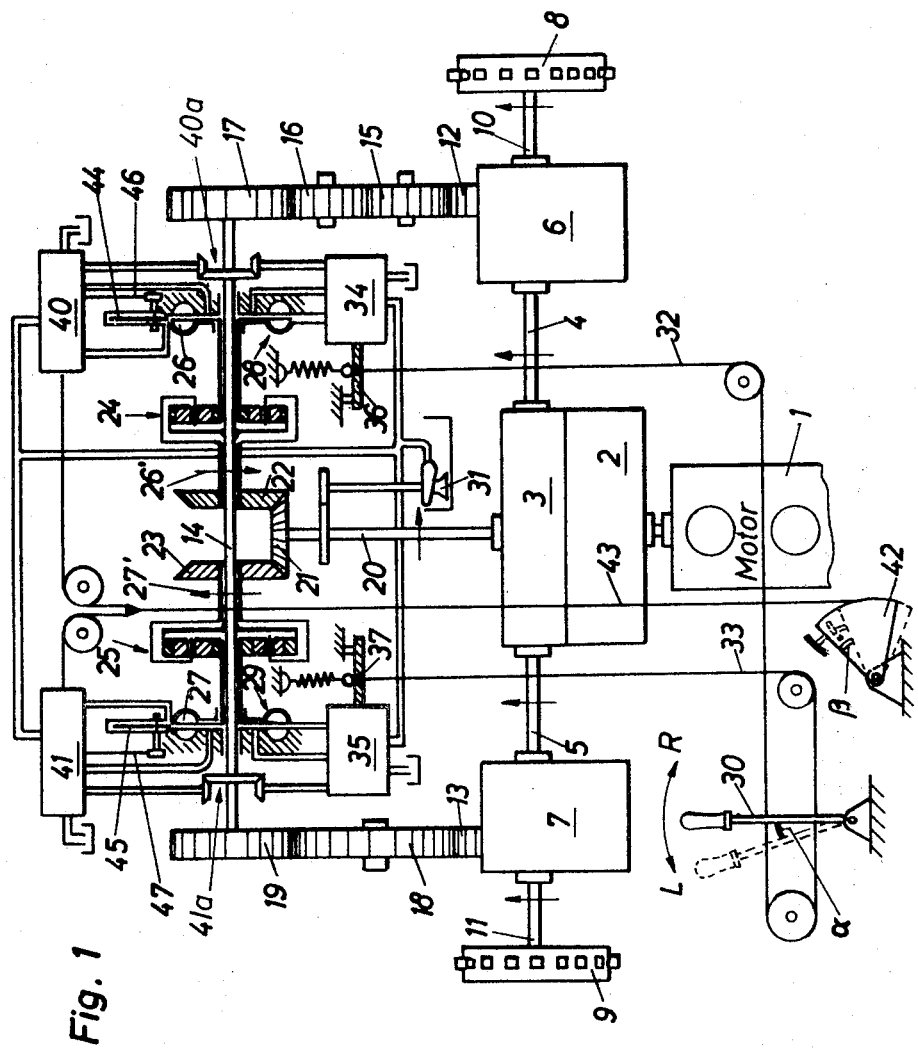

The present invention relates to a track-laying vehicle with a drive of the two chains or caterpillar tracks from a distributing transmission through the intervention of a differential transmission each, the free transmission members of which rest against each other through a supporting shaft, which latter during a straight forward or rearward drive stands still and which when rotating in one direction or the other, accelerates one track while retarding the other track, and vice versa. The invention concerns more specifically a track-laying vehicle as set forth above with a steering drive starting from the distributing transmission, by means of which steering drive through the intervention of a further differential transmission the respective rotor member of two identical brakes is driven in such a way that the rotors rotate in opposite directions with regard to each other while the two free transmission members of the two last-mentioned differential drives are fixedly connected to the supporting shaft and rotate the same in the direction of rotation of that brake which is engaged. The transmission of the type set forth above is furthermore equipped with a control stick by means of which, depending on the magnitude and direction of deviation of said control stick, one or the other brake is more or less engaged and accordingly the supporting shaft is caused to rotate in one or the other direction to a greater or less extent. Finally, the above-mentioned track-laying vehicle is also provided with a braking lever.

The above-mentioned track-laying vehicles include in particular tanks and also graders and similar vehicles and implements. With tanks, the weight of those parts not used for armor, and the space requirement, should be a minimum. This is one of the foremost requirements when building such military vehicles. Of course, advances in this respect will also benefit similar civilian vehicles.

When steering track-laying vehicles, a considerable portion of power is derived from the driving energy. The steering brakes must be able to convey away considerable amounts of energy.

In view of the advances in the construction of hydrodynamic brakes, it has become possible to design the steering brakes as hydrodynamic brakes, and while securing a favorable weight and low space requirement for the steering brakes, also to dimension the same sufficiently. With small dimensions of the circuit, the brakes will respond quickly. The problem of conveying away the heat can with a brake of this type be mastered better than with any other brake.

In spite of these considerable advantages, a track-laying vehicle of the above-mentioned type and equipped with a pair of hydrodynamic steering brakes has still one important drawback. More specifically, a certain curve radius of the vehicle is not associated with each control stick deviation. When driving across-country, the curve radius is in addition to the control deviation also dependent on the resistance which the tracks or chains encounter on the road or in the terrain. A continuous post steering with the control stick in conformity with the respective ground conditions is, therefore, necessary. This, of course, affects the driving safety and the precision of maneuverability.

A further disadvantage consists in that the brakes installed for steering purposes can be used as retarding brakes only during straight forward or rearward driving. However, particularly in connection with armored vehicles such as tanks, it is extremely important that they be able from a zigzag drive intended to mislead the enemy, to come to a quick standstill position for firing, which means that they should also be adapted to be braked when driving throuhg a curve.

It is, therefore, an object of the present invention to provide a transmission, especially for track-laying vehicles, which will overcome the above-mentioned drawbacks.

It is another object of this invention to provide a transmission for track-laying vehicles which will solve the problem of curve stability and which will permit the braking power provided for the steering also to be used for retarding the vehicle while driving through a curve.

Figure 2:
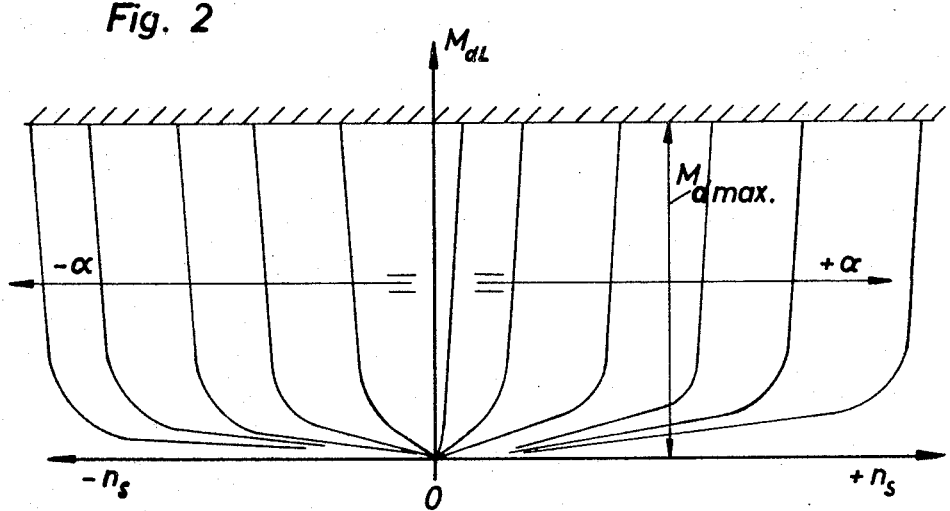
Figure 3:
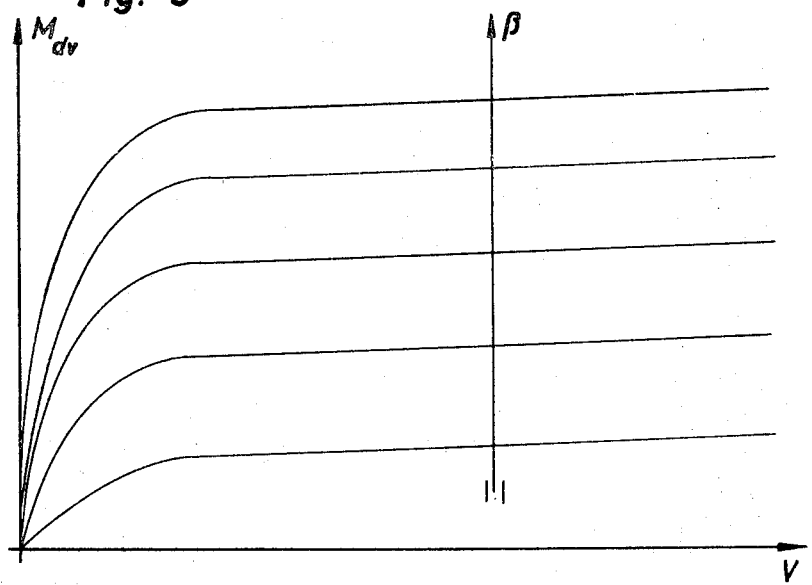

These and other objects and advantages of the invention will appear more clearly from the following specification in connection with the accompanying drawings, in which:

FIG. 1 diagrammatically illustrates the transmission of a track-laying vehicle with the actuating members for steering and braking, in conformity wtih the invention;

FIGS. 2 and 3 represent brake force diagrams of the steering and retarding brake.

A track-laying vehicle of the above-mentioned general type is in conformity with the present invention characterized in that the two brakes are in a manner known per se designed as hydrodynamic brakes and that the control stick for purposes of stabilizing the speed difference of the two tracks in spite of different resistance encountered thereby is respectively coupled with one filling or pressure control means for each brake, which control means, depending on the steering angle or the steering deviation of the control stick, will control the corresponding brake rotor and thereby the supporting shaft so as to secure a constant speed. The track-laying vehicle according to the invention is furthermore characterized in that for each brake a further filling or pressure control device is coupled to the brake lever and that these devices during the braking action when driving straight forward or backward fill both brakes and when braking while driving through a curve, fill only the non-engaged brake and control the same independently of the driving speed in proportion to the brake lever deviation $\beta$ for a constant braking moment.

If, when driving through a curve, the driving resistance of one track changes, so that it rolls at a lower speed, and that accordingly the radius of curvature has the tendency to change, the filling and/or pressure control device of the steering brake will bring about a corresponding increase in the braking moment so that the speed of the braking ratio and the speed of the supporting shaft and consequently the differential speed of the two brakes and the radius of curvature remain the same. This means the constant-speed-control device of the steering brakes which is coupled to the control stick assures a curve stability of the track-laying vehicle even though the rolling resistance may suddenly have increased on one of the tracks.

When driving straight forward or backward, the steering brakes when both filled to the same extent will, through the steering drive of the distributing transmission exert a retarding moment upon the driving wheels of both tracks and thus can be employed as drive retarding brakes. A retarding braking is, however, also possible when driving through a curve, due to the constant-speed governor coupled to the control stick. This control device is not able to distinguish whether a resistance encountered by the chain is due to the terrain or due to a brake acting from the interior of the vehicle. The differential speed of the chains and thus the curve radius will also when pulling the brake lever be established and maintained proportionally to the control stick deviation. When driving through a curve, however, during the pulling of the brake lever, only that brake is engaged which is not used for the steering operation. The constant-speed-control device sees to it that the braking moment of the other brake will also increase to this value. In this way, during driving through a curve, a retardation is effected only with the steering brakes.

It will be readily appreciated that the retarding moment when driving through a curve cannot be increased at will. The maximum possible retarding moment when driving through a curve is obtained as the difference between the maximum braking moment which is still feasible with regard to reasons of strength by braking with hydrodynamic brakes, and the steering braking moment necessary for the speed difference of the tracks. The last-mentioned component is all the higher the shorter the radius of the curve through which the vehicle drives, or the higher the speed of the supporting shafts or brake rotor. Therefore, actually, the possible braking moment should be limited in conformity with the deviation of the control stick so that when driving throuhg a curve, the curve radius will not increase in view of the retarding brake. However, in connection with this braking limitation, it should be taken into consideration that the drive through a curve, even with narrow curves, causes a strong braking of the vehicle, so that an emergency position in view of insufficient braking capacity, will not occur. Furthermore, it is also to be borne in mind that the retarding braking effect of the steering brakes is particularly high in view of the fact that its effect increases with the number of stages of the shiftable transmission because the rotor speed thereof is always proportional to the motor speed. If, nevertheless, when driving through a curve, the vehicle is retarded faster, as is possible with the steering brakes, the motor brake may, for instance, be employed as an aid.

Referring now to the drawing in detail, the arrangement shown therein comprises a motor 1 from which the driving energy passes through the changeable transmission 2 to the distributing transmission 3 flanged thereto. From here the two shafts 4, 5 convey the power uniformly distributed over these two shafts to the two differential transmissions 6, 7, respectively arranged as image to each other in which they are respectively connected to one of the main transmission members. The driving shafts 10, 11 which are operatively connected to the driving wheels 8, 9 are respectively connected to the second main transmission member of the differential transmissions 6, 7. The two third main transmission members 12, 13 rest against each other by means of the supporting shaft 14 which is arranged parallel to shafts 4, 5 and the driving axles and by means of the gears 15, 16, 17, 18, 19.

When the drive is under load, the gears 12, 13 have the tendency both to rotate in the same direction and at the same power. In order to prevent this, these two gears are in the manner described above rigidly supporting each other through a reversible drive at the transmission ratio of 1:1. When driving along a substantially straight line, i.e. at the same circumferential speed of the two driving gears 8, 9, the supporting shaft is at a standstill because the tooth flank pressures on gears 12, 13 are of the same magnitude.

When the supporting shaft 14 is rotated in one direction, the gear 13 is driven in the same direction of rotation, and the gear 12 is driven at the same speed as gear 13 in the opposite direction. In this way, the speed of one driving wheel is increased by a certain amount which is proportional to the speed of the supporting shaft 14, and the speed of the other drive wheel is reduced by the same amount, and vice versa, depending on the direction of rotation of the supporting shaft. In view of this speed difference of the driving wheels, a drive of the vehicle through the curve will be effected. The higher the speed of the supporting shaft, the higher will be the speed difference of one of the driving gears with regard to the other, and the shorter will be the curve radius. This interdependency is linear.

For bringing about a speed difference with regard to the tracks, the supporting shaft 14 has to be driven. To this end, depending on the condition of the ground, and the curve radius, a more or less considerable component of the driving power is required. The drive of the supporting shaft 14 is effected from the distributing transmission through the steering shaft 20 which rotates at a speed which is proportional to the shaft of the motor 1. The steering shaft, through the bevel gear drive 21, 22, 23 and through the spur gear planetary gear transmissions 24, 25 drives the rotor 26 and 27 of the two hydrodynamic brakes 28, 29. The hollow gears of the planetary gear transmissions 24, 25 are fixedly connected to the supporting shaft 14. The planetary gear carriers are driven and the output to the brake rotors is effected by the sun-wheels which rotate in opposite direction with regard to each other (arrows 26', 27'). When driving straight forwardly or backwardly, i.e. when the supporting shaft 14 is at a standstill, the brake rotors rotate at the same speed proportional with regard to the motor speed. This means that also in the low velocity ranges at low vehicle speeds, the brakes have a high braking capability.

If one of the brakes 28, 29 is engaged, the pertaining sun-wheel is retarded. Proportionally to the withdrawal of speed from said sun-wheel, in conformity with the inner transmission ratio of the planetary gear transmission 24, the supporting shaft 14 is accelerated from its standstill and, more specifically, in the direction of rotation of the braked rotor. (Arrows 26', 27'). This rotational speed is superimposed upon the speed of the driving wheels in such a way that it is added to the speed of one driving wheel and is subtracted from the speed of the other driving wheel. The vehicle will thus drive through a curve.

The filling of brake 28, 29 and thus the drive through a curve is controlled by the control stick 30. By means of cables or the like, 32, 33, a filling and/or pressure control device 34, 35 is actuated, depending on the direction (left or right) of the control stick deviation ($-\alpha$ or $+\alpha$). The control devices 34, 35 adjust the degree of filling and/or the pressure in the pertaining brake 28, 29 in such a way that proportional to the angle $\alpha$ of the stick 30 or the lever 36, 37, the speed of the supporting shaft 14 is timewise constant. The control devices obtain their control factor, the supporting shaft speed, through a bevel gear transmission. Another possibility of conveying this speed in an analogous magnitude to the control device consists in causing the delivery flow of a volumetric pump driven by the supporting shaft 14 and having a throttled bypass at the pressure side, to act upon a fixed surface. The piston force will then have a fixed ratio to the speed of the supporting shaft 14. The control devices are supplied with working fluid for the hydrodynamic brakes by a filling pump 31 driven from the steering shaft 20. These control devices are through a filling and return conduit connected to the speed governor.

In view of the control characteristics of the speed governor for timewise constant speed of the pertaining brake rotor, the differential speed of the tracks and thus the curve radius of the vehicle will be constant in spite of varying driving resistances at the tracks. FIG. 2 illustrates the control characteristic of the speed governor 34, 35 in the form of a diagram. Plotted over the abscissa is the speed of rotation $n_s$ of the supporting shaft 14 for both directions of rotation. Instead of the speed $n_s$ of the supporting shaft, also the curvature of the curve could be plotted as reciprocal value of the radius of the curve. The left quadrant applies to left-hand curves and the right quadrant applies to right-hand curves. Plotted over the ordinate is the torque $M_{dL}$ of the steering brake. Each of the illustrated curves of the pairs of curves represents the course of the steering brake moment at a certain control stick angle $\alpha$ at different resistances. It will be evident that with a resistance on one track corresponding to an increase in the steering braking moment $M_{dL}$, the speed of the supporting shaft 14 and thus the radius of the curve, will practically not change at all.

This stabilization of the driving direction when driving through a curve will also be effective also with the infinitely large curve radius, which means when driving straight ahead. If, for instance, one of the tracks during staraight driving hits an obstacle, this side of the vehicle will have the tendency to lag with regard to the unimpeded track. The supporting shaft would, therefore, try to follow the tendency to be rotated by the tracks. Since, however, the control stick occupies its position for straight-ahead drive and therefore calls for the speed zero for the supporting shaft 14, a rotation of the supporting shaft would represent a deviation from the control which initiates an increase in the brake filling. Natural minor control deviation may occur, which means that the supporting shaft may start to rotate. However, almost immediately thereafter, that brake is filled which has to be engaged in order to bring about the elimination of the control deviation. This means that the track which up to that point was unimpeded, will be under load of the one steering brake to such an extent that both tracks encounter the same resistance. By a temporary increase in the driving power, the obstacle encountered during the straight drive will be overcome. Since, however, the track which is under load by the unevenness of the terrain is free, whereas the braked track is not, a slight deviation control from the control magnitude, i.e. from the straight-ahead direction or the standstill of the supporting shaft will occur. This control deviation calls for the emptying of the brake which was filled up to that time and calls for the filling of the other track, which brings about a minor control deviation in the other direction. The play thus described will be repeated to a similar extent with the reverse sign. The vehicle plays itself very quickly back to the straight-driving direction.

This advantageous behavior of the steering of the vehicle is again the starting point for the second part proper of the invention, viz for the possibility of using the steering brake also as retarding brake independently of the driving in straight direction or through a curve. To this end, the two hydrodynamic brakes 28, 29 have associated therewith two further filling and/or pressure governors 40, 41. These governors, however, have a control characteristic which is different from that of the speed governors 34/35. More specifically, they control the filling and/or pressure in the brake independently of the speed of the supporting shaft or of the vehicle in such a way that the braking moment is timewise constant in conformity with the deviation $\beta$ of the brake pedal 42. The governors 40 and 41 are thus torque governors. By means of the cable 43 coming from the brake pedal 42, the torque governors 40/41 are actuated in each instance to the same extent. However, they are not in each instance in action in the same manner. They react to the same extent only during the straight drive of the vehicle or when the supporting shaft is at a standstill. In such an instance, when actuating the retarding brake, the governors fill both working circuits uniformly so that the moment of both brakes increases proportionally with regard to the brake pedal angle $\beta$. The retarding moment is in this instance exerted upon the driving gears 8, 9 through the intervention of the steering shaft 20 and the distributing drive 3. When the vehicle passes through a curve or when the supporting shaft rotates, the supporting shaft is in conformity with the direction of the curve or the direction of rotation of the supporting shaft filled for temporary constant moment in conformity with the pedal angle $\beta$. That torque governor which is associated with the respective brake engaged for steering purposes, will when driving through a curve, not become active at all. For ascertaining the direction of the curve and the curvature of the curve, the speed $n_s$ of the supporting shaft 14 is associated with the two torque governors 40/41 mechanically through a cone gear transmission each. Naturally, these two indications could, as indicated above, also be converted hydraulically. The torque governors 40/41 are, similar to the speed governors 34/35, connected to the filling pump 31. The two governors 40/41 are connected to the pertaining brake through filling and emptying conduits, respectively.

The two hydrodynamic brakes respectively have a ventilation valve 44, 45 adapted to be moved into the gap of the blade wheels. The moved-in valve or slide plate will, depending on the overlapping with the torus of the working circuit, eliminate to a major extent the permissible torque with the emptied brake (ventilation losses). This insertion is effected when driving through a curve in each instance, except when additional braking is effected in the curve. To the extent to which the rotor of the brake engaged for steering purposes rotates slower than during straight forward drive, the rotor of the non-used brake will rotate faster.

The said last-mentioned rotor will when driving through a curve pass into a velocity range in which the ventilation losses of the blade rings running in air are no longer negligible. These ventilation losses will, by inserting the ventilation valve, be reduced to a tolerable extent. This is effected in the illustrated embodiment by the torque governors 40, 41 through a block-and-tackle or coupling 46, 47.

FIG. 3 shows the control characteristic of the torque governors 34, 35. Plotted over the abscissa is the speed V of the entire vehicle, or, for instance, the speed of rotation of the shaft 4 or 5. Plotted over the ordinate, similar to FIG. 2, is a torque, viz the delaying-brake torque $M_{dv}$. Depending on the brake pedal angle $\beta$, an approximately constant moment is obtained which is independent of the brake rotor speed.

As will be evident from the above, the advantage of the present invention is seen primarily in the stability as to driving direction of the track-laying vehicle during all driving conditions encountered, and is also seen in the low weight and the relatively low structural costs and space requirement and in the possibility of exploiting the high braking capacity installed for steering purposes, for retarding the vehicle during all driving conditions encountered. Thus, weight, space, and money are saved while additional retarding brakes are not required.

For the sake of clarity it may be added that, as will be evident from FIG. 1, the torque governors 40, 41 and the speed governors 34, 35 are preferably drivingly connected to the intermediate support shaft 14 by a bevel gear drive generally designated 40a and 41a respectively.

It is, of course, to be understood, that the present invention is, by no means, limited to the particular construction referred to above, but also comprises modifications within the scope of the appended claims.

What I claim is:

1. A control system for an endless track vehicle having a pair of drive wheels and having a motive power distributing transmission connected by respective shafts to differential transmission means interconnected by gear trains through an intermediate supporting shaft ineffective during straight travel movement and otherwise during turning travel movement effective for regulating accelerated and retarded drive movement of the pair of wheels comprising: two hydrodynamic fluid control means respectively associated with said drive wheels and each including a stator chamber and a rotor journalled on said intermediate shaft and rotatable in a direction of rotation opposite to that of the other, gear transmission means between said motive power distributing transmission and respective rotors of said hydrodynamic fluid control means, speed control governor means having fluid connection to the respective stator chamber of said hydrodynamic fluid control means, directional control lever means operatively coupled with each of said speed control governor means to stabilize speed differential of the track drive wheels regardless of differing drive reaction, said control lever means being operable in conformity with its position to determine speed rate of said supporting shaft and corresponding rotor by fluid fill and pressure regulation through respective speed governor means for each of said hydrodynamic fluid control means, torque control governor means also having fluid connection to the respective stator chamber of said hydrodynamic fluid control means, and brake actuator means operatively interconnected to each of said torque control governor means for regulating fluid supply to the respective stator chamber of said hydrodynamic fluid control means, both of said hydrodynamic fluid control means upon braking during straight travel of the vehicle and only differentially one of said hydrodynamic fluid control means upon braking during turning travel of the vehicle being fluid filled and regulated proportionally to braking torque rate due to brake actuator means position independently of vehicle travel speed.

2. The control system according to claim 1, which includes a fluid supply pump drivingly connected to said gear transmission means and in fluid communication with both said speed control governor means and said torque control governor means.

3. The control system according to claim 1, in which said gear transmission means includes bevel gear drive means journalled on said intermediate supporting shaft, and planetary gear units respectively drivingly interconnecting said bevel gear drive means and one but a different one of said rotors.

4. The control system according to claim 3, in which each of said planetary gear units includes: a hollow gear fixedly connected to said intermediate supporting shaft, a sun wheel journalled on said intermediate supporting shaft and drivingly connected to the pertaining rotor, and spur gears drivingly connected to said bevel gear drive means.

5. The control system according to claim 3, wherein each hydrodynamic fluid control means has a ventilation valve operable when desired to relieve air from the stator chamber.

6. The control system according to claim 5, which includes coupling means effecting operation between each torque governor means and each ventilation valve respectively.

References Cited

UNITED STATES PATENTS

| | | | |
|---|---|---|---|
| 2,352,483 | 6/1944 | Jandasek | 180—6.44 |
| 2,470,209 | 5/1949 | Bechman et al. | 180—6.44 |
| 3,015,971 | 1/1962 | Sauer et al. | 74—720.5 |
| 3,349,860 | 10/1967 | Ross | 180—6.44 |
| 3,358,786 | 12/1967 | Hultgren et al. | 180—6.7 |
| 3,365,013 | 1/1968 | Lundin et al. | 180—6.44 |
| 3,425,296 | 2/1969 | Livezey | 74—720.5 |

A. T. McKEON, Primary Examiner

U.S. Cl. X.R.

74—720.5